Dec. 23, 1958   H. THÜRLINGS   2,865,311
CANDY MAKING MACHINE

Filed March 27, 1957   3 Sheets-Sheet 1

INVENTOR.
Hermann Thürlings
BY
Patent Agent

Dec. 23, 1958 H. THÜRLINGS 2,865,311
CANDY MAKING MACHINE
Filed March 27, 1957 3 Sheets-Sheet 3

INVENTOR.
Hermann Thürlings
BY
Patent Agent

United States Patent Office 2,865,311
Patented Dec. 23, 1958

2,865,311

CANDY MAKING MACHINE

Hermann Thürlings, Viersen, Rhineland, Germany, assignor to Hansella-Werke Albert Henkel Aktiengesellschaft, Viersen, Rhineland, Germany Application March 27, 1957, Serial No. 648,836

Claims priority, application Germany November 17, 1956

4 Claims. (Cl. 107—8)

The present invention relates to a machine for stamping or molding candies. The stamping of candies has heretofore been effected by means of machines which may be sub-divided into two groups. According to the first group of such machines, the sugar or candy strand which when producing filled candies is provided with a vein containing filling material, is cut up into individual pieces between mold halves. These cut up pieces are then stamped or pressed into candies between said mold halves by means of pairs of punches displaceable in axial direction with regard to said mold halves. The mold halves consist either of chain members, stamping chamber lids or are milled into the periphery of wheel-like bodies. Depending on the combination of the mold halves, more or less filled candies can be produced. Candies made by means of this type of machines have the drawback that they have fins along the lines where the individual pieces have been separated or cut off from the candy or sugar strand. These fins impair the appearance of the candies and impede the wrapping as well as the coating with chocolate.

In addition thereto, these heretofore known machines do not meet the requirements of modern candy-producing machinery.

The second group of heretofore known candy-producing machines represents machines for making so-called fin-free candies which, however, can either not at all or only to a minor extent be filled with a filling. With this type of machines, the candy or sugar strand is cut up into individual pieces by means of two separating discs arranged one above the other. Adjacent the lower separating disc there is provided a perforated disc the perforations or holes of which correspond to the cross section of the respective candies, and the lower half of which corresponds to cutouts in the lower separating disc. Axially arranged with regard to said cutouts in the lower separating disc and the perforations in the perforated disc are pairs of punches which move the separated sugar strand pieces laterally into the perforated disc and press said pieces in said perforated disc into candies. This arrangement has the following drawbacks:

When cutting off the sugar or candy pieces, the filling in the strand is pressed back because with said separating discs one or at best two pairs of separating edges only take part in the separating process. Furthermore, with machines of a high output, the separating edges penetrate too fast into the sugar strand and cut up the same instead of squeezing the pieces off. As a result thereof the filling flows out of the candy strand at the portion of separation. The separating discs confine the separated candy strand pieces for such a brief time that it is impossible during this short time properly to move the separated candy strand pieces into the perforated disc. Therefore, the transfer of the candy strand pieces into the perforated disc is effected later at a point where the candy strand pieces are not held any longer by the separating discs but merely lie loosely on the lower separating disc. When then transferring the separated candy strand pieces into the perforated disc, the plastically easily deformable sugar pieces are upset whereby portions of the candy strand pieces are sheared off between the advanced punch and the perforated disc. In order to prevent such shearing off, the cut-out or milled-out portions in the upper separating wheel are given a depth which is less than half the cross section of the candy. While in this way the shearing off of portions of the candy strand pieces at the upper edge thereof is avoided, the cutting off at the respective planes of separation still causes a considerable waste, and furthermore a portion of the filling flows out when making highly filled candies.

It is, therefore, an object of the present invention to provide a candy-making machine which will overcome the above mentioned drawbacks.

It is another object of this invention to provide a candy-stamping or molding machine which will make it possible to produce highly filled candies without fin formation.

It is still another object of this invention to provide a candy-stamping or molding machine of the type set forth in the preceding paragraph which will far exceed the output of heretofore known candy-stamping or molding machines.

These and other objects and advantages of the invention will appear more clearly from the following specification in connection with the accompanying drawings, in which.

*General arrangement*

The candy-making machine according to the present invention likewise comprises a perforated disc, but in contrast to heretofore known candy-stamping machines of the above mentioned second group, the separating discs are not arranged one above the other but one within the other. The separation or severing of the candy strand pieces is, therefore, effected over a larger distance so that a plurality of pairs of separating or severing edges will simultaneously take part in the severing process. In view of the numerous notches continuously produced in the sugar or candy strand, the filling is prevented from withdrawing. Furthermore, also at high speeds, the cutting off or severing operation is effected at such a low speed that no danger exists that the sugar strand will be cut to pieces. The separating or severing discs arranged one within the other confine the separated or severed candy strand portions for a sufficiently long period to allow proper transfer of the said separated candy strand pieces into the perforated disc while said candy strand pieces are confined by said separating discs. The cutoffs in the outer separating disc or annular separating member equal half the candy cross section, as is the case with the inner separating disc or annular separating member so that the conveying punch can advance in each position between the cutouts. The candy strand pieces are not upset beyond the contour of the perforations, and no waste occurs nor does the filling drop out of the candy strand pieces.

Inasmuch as the processing of highly filled sugar or candy sticks or strands is dependent on the condition that the cutting up of the sugar stick or strand into sugar pieces as well as the stamping of the candies will occur as slowly as possible, it is the tendency to spread the molding process over a long circumferential distance of the molding wheel body as possible. Furthermore, following the ejection of the stamped candies, the molding punches have to be returned to their initial position. Also for this purpose the circumferential distance required increases with the increase in the output of the machine. The machine according to the present invention makes it possible to place the entrance for the sugar or candy stick or strand next to the ejection station for the finished candies so that the entire circumference of the stamping wheel body may be employed for the molding of the candies and the axial movement of the stamping punches.

Structural arrangement

Figure 1:
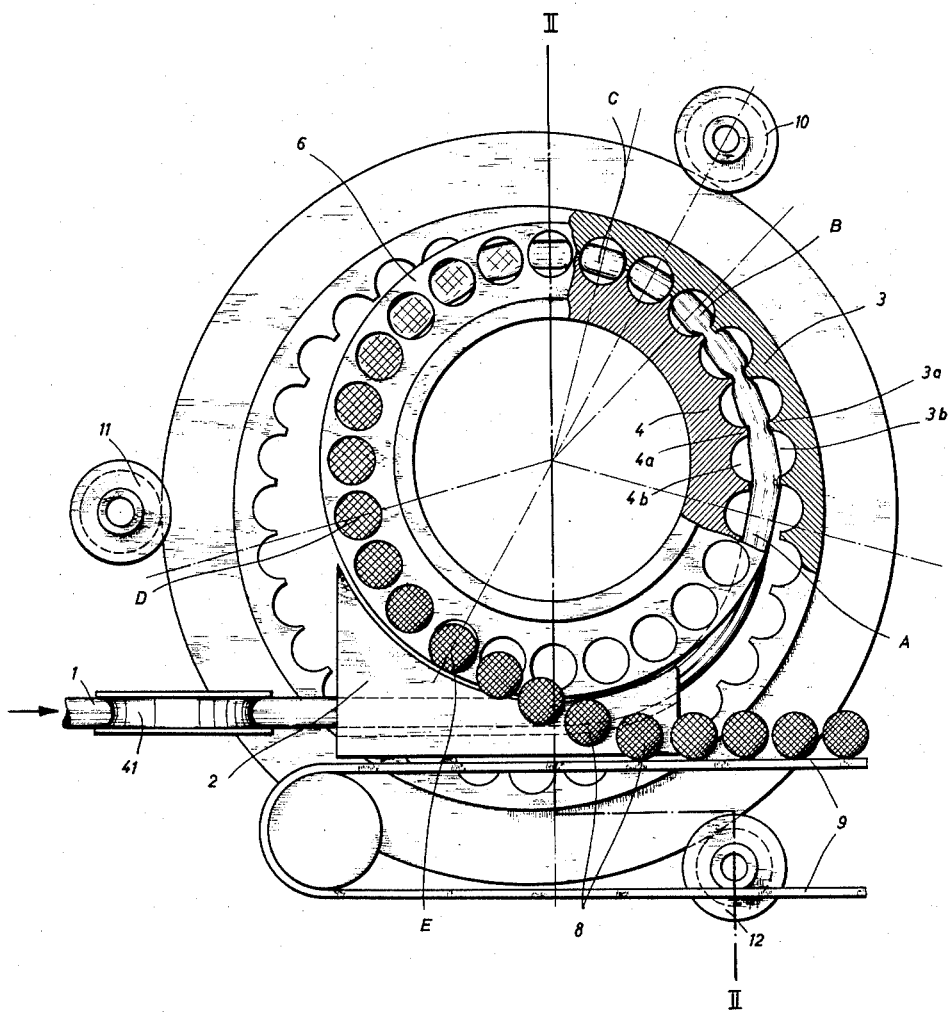
Fig. 1 is a partial front view and partial section of a candy-making machine according to the invention.

Referring now to the drawing in detail, the sugar or candy stick or strand 1 is moved and guided between two oppositely located rollers 41 (one only being visible in Fig. 1). The said stick or strand 1 then passes behind the guiding member 2 to the separating or severing discs 3 and 4. As will be evident from Fig. 1, one separating disc is located eccentrically with regard to the other separating disc. While the stick or strand 1 passes over the distance between the points A and B, said stick or strand is cut up into sugar stick pieces between the outer separating disc 3 and the inner separating disc 4. More specifically, this is effected by a squeezing operation between the teeth-like elements 3a, 4a of the recesses 3b, 4b which form the molds for the candies. When the said separated candy or sugar strand pieces pass through the distance B—C, the said sugar strand pieces are by means of punches 5 (Fig. 2) pushed into the portion 6a of the perforated disc 6. It is over this distance C—D that the stamping of the candies takes place in the bores or perforations of the perforated disc 6 and between the punches 5 and 7. The finished candies 8 are ejected over the distance D—E by means of the punch 5 so that they drop upon a conveyor belt 9 which conveys the same in a manner known per se into a cooling tub.

Figure 2:
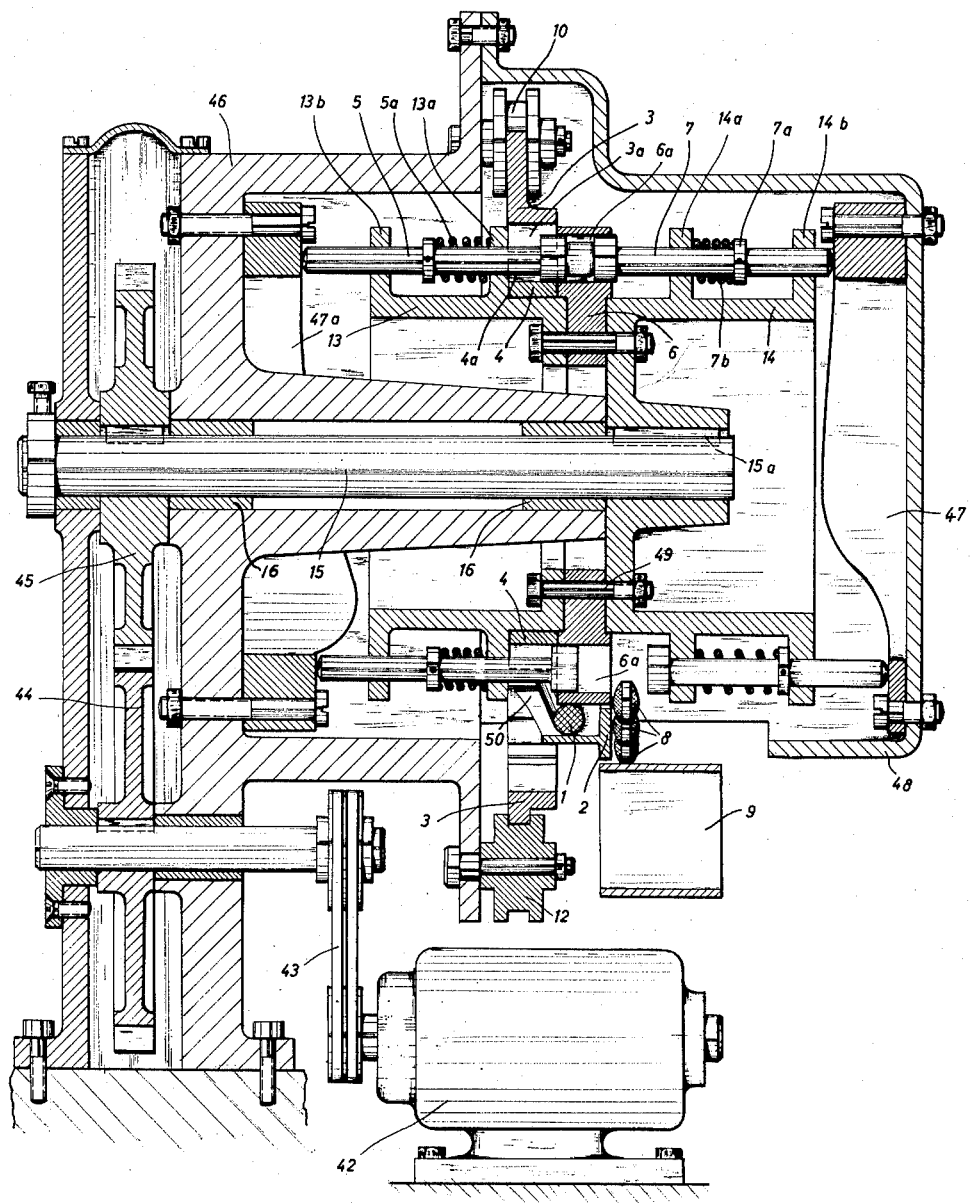
Fig. 2 is a section taken along the line II—II of Fig. 1.

As has been illustrated in Fig. 2, the machine is driven by a motor 42 which drives a shaft 15 through a belt drive 43 and gears 44 and 45. The shaft 15 is journalled in a bearing 16 supported by the machine frame 46. The front end of the drive shaft 15 is by means of a key 15a keyed to a bushing 14 the circumference of which is provided with flanges 14a, 14b having the stamping punches 7 axially displaceably arranged therein. Springs 17b supported by the respective stamping punch are arranged between the flanges 14a and abutment elements 7a. These springs continuously hold the stamping punches in engagement with a cam disc 47 arranged in the interior of the lid 48 which latter is connected to the machine frame 46. The perforated disc 6 and a bushing 13 are connected to the bushing 14 by means of screws 49. The bushing 13 carries the inner separating disc 4. The bushing 13 is provided with flanges 13a, 13b in which the stamping punches 5 are likewise axially displaceably arranged. These stamping punches are acted upon by springs 5a which continuously hold the punches 5 in engagement with a cam disc 47a connected to the machine frame 46.

The outer separating disc 3 is held by guiding rollers 10, 11, 12 (Fig. 1) and, when the bushings 14 and 13 rotate, is moved along by means of the punches 5 extending into the molds 3a.

Figure 3:
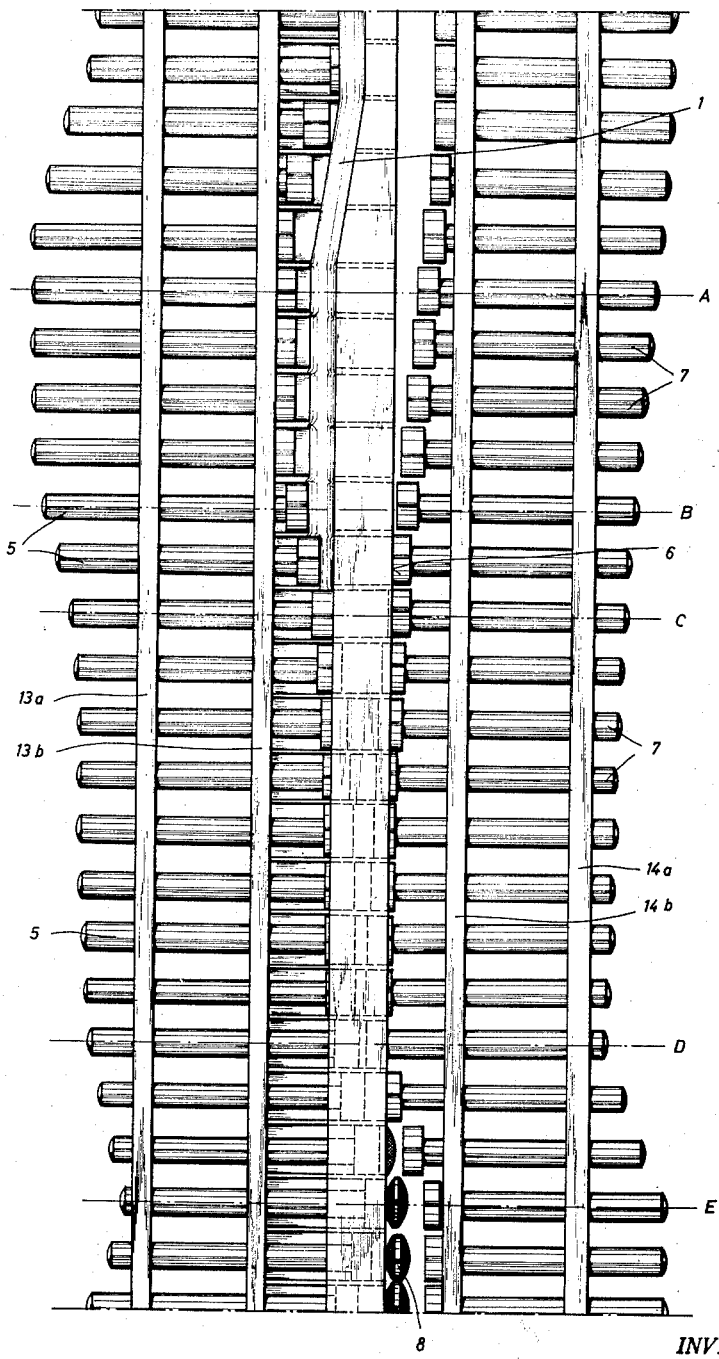
Fig. 3 is a development of the inner separating disc with the molding punches in the drawing plane.

When the shaft 15 and thereby the bushings 13, 14, the perforated disc 6 and the separating discs 3, 4 are rotated, the ends of the punches 5, 7 slide along the correspondingly fixedly arranged cam discs 47, 47a and successively occupy the positions shown in Fig. 3.

Inasmuch as the outer separating disc 3 is eccentrically located with regard to the perforated disc 6, and since the outer diameter of the perforated disc 6 is less than the inner diameter of said outer separating disc, the entrance for the sugar or candy stick or strand 1 into the separating discs 3, 4 may be arranged at 50 adjacent the ejection station, i. e. where the completed candies are ejected from the perforated disc 6.

It is, of course, to be understood that the present invention is, by no means, limited to the particular constructions shown in the drawings but also comprises any modifications within the scope of the appended claims.

What I claim is:

1. In a machine for stamping out candies from a candy strand: an outer rotatable annular severing member having its inner periperal portion provided with inner severing teeth, an inner rotatable severing member arranged within said outer annular severing member and in eccentric relationship thereto, said inner severing member having its outer peripheral portion provided with outer severing teeth facing said inner severing teeth, said inner and outer severing teeth being adapted in response to a substantially synchronous movement thereof to sever portions from a candy strand fed between said inner and outer severing teeth, said inner and outer severing teeth confining with each other spaces for receiving portions severed from said candy strand, a plurality of first punch means mounted along a circular line and arranged for rotation together with said inner severing member about the axis of rotation of the latter and reciprocable in a direction parallel to said axis, the axes of said first punch means respectively being in substantial alignment with the axes of said spaces when the teeth confining the same substantially engage each other, a rotatable disc provided with a plurality of bores arranged in axial alignment with said punch means, said disc being rotatable together with said severing members, said first punch means being movable to enter said spaces to thereby move the respective severed candy strand piece faced by the respective punch means into the adjacent bore of said disc, a plurality of second punch means corresponding in number to that of said first punch means and respectively located in axial alignment therewith and arranged for rotation in synchronism with and about the axes of said severing members, said second punch means being movable into said bores in a direction opposite to the direction of movement of said first punch means into said spaces thereby in cooperation with said first punch means to compress the respective severed candy strand portion in said disc between a respective pair of aligned first and second punch means, said second punch means also being retractable from said disc to allow said first punch means to eject the respectively compressed candy strand piece, means continuously urging said first and second punch means away from each other, cam means controlling the movement of said first and second punch means, and means for rotating said disc and said severing members.

2. In a machine for stamping out candies from a candy strand: a rotatable outer severing member having its inner peripheral portion provided with substantially evenly spaced recesses defining therebetween severing teeth, a round inner severing member rotatable in synchronism with said outer severing member and eccentrically arranged relative thereto, said inner severing member having its outer peripheral portion provided with substantially evenly spaced recesses defining therebetween second severing teeth facing said first severing teeth, said first and second severing teeth being movable relatively away from each other during one portion of their rotational movement to receive a candy strand therebetween and being movable relatively toward each other during the other portion of their rotative movement for severing portions from said candy strand, each of the recesses in said outer severing member being complementary to the respective adjacent recess in said inner severing member to form therewith a passage for temporarily holding the respective severed candy strand piece, a mold member coaxially mounted with regard to said inner severing member and arranged for synchronous rotation with said severing members, said mold member being provided with a row of circularly arranged bores conforming in cross section approximately to the cross section of the candies to be made and being respectively arranged in substantially axial alignment with those of said passages which are formed by the respective first and second teeth occupying their closest position relative to each other, a plurality of pairs of axially aligned plunger means rotatable in synchronism with and about the axis of said mold member, the plunger means of each of said pairs being movable toward and away from each other while the respective severed candy strand piece is therebetween in said mold member, driving means for rotating said severing members substantially in synchronism with each other, and control means controlling the movement of said plunger means for successively transferring the severed candy strand pieces from said spaces into said mold member for molding therein and subsequent ejection therefrom.

3. In a machine for stamping out candies from a candy strand: an outer rotatable gear-like severing member, an inner rotatable gear-like severing member arranged for synchronous rotation with and mounted within and in eccentric relationship to said outer severing member, both severing members respectively being provided with teeth spaced from each other by substantially identical recesses, the teeth of one severing member facing the teeth of the other severing member and gradually approaching the same from a maximum distance between the said two severing members to a minimum distance therebetween thereby defining between the teeth of said two severing members a gradually narrowing passage for a candy strand for gradually squeezing off pieces from a candy strand passing through said passage, said passage having its entrance spaced from the point of said minimum distance by a plurality of the teeth of said outer severing member, the recesses of one severing member being complementary to and respectively forming with the respective adjacent recesses of the other severing member chambers for temporarily holding the candy strand pieces being squeezed off, a rotatable mold member arranged coaxially with regard to said inner severing member and arranged for synchronous rotation therewith, said mold member being provided with a row of circularly arranged bores conforming in cross section substantially to the cross section of the candies to be made, said bores being arranged so that each bore will respectively be in substantially axial alignment with one of said chambers when the respective chamber is at said point of minimum distance, a plurality of pairs of axially aligned plungers arranged at both sides of said mold member and rotatable in synchronism about the axis of rotation of said mold member, the plungers of each of said pairs being movable toward and away from each other while the respective squeezed-off candy strand piece is therebetween, driving means for rotating said mold member and said severing members in substantial synchronism with each other, and control means controlling the movement of said plunger to cause the same to transfer the squeezed-off candy strand pieces from said chambers into said mold member and subsequently ejecting said transferred pieces from said mold member at a station adjacent to said entrance.

4. In a machine for cutting out candies from a candy strand: two round rotatable severing members, one of said members being provided with inner teeth and the other member being provided with outer teeth facing said inner teeth and being eccentrically located in said other severing member thereby forming a crescent-shaped passage for receiving the candy strand to be cut into candy pieces by the teeth of said two severing members, said severing members being connected with each other for synchronous rotation with each other, a rotatable mold member coaxially arranged with but laterally of said inner severing member and being connected to said inner severing member for synchronous rotation therewith, said mold member having a row of circularly arranged bores for successively receiving cut-off candy strand pieces from between said inner and outer teeth and serving as mold for the candy pieces to be produced, a plurality of pairs of plunger means respectively axially aligned with each other and with the bores of said mold member and rotatable in unison with each other about the axis of rotation of said mold member and in synchronism therewith, said plunger means being movable toward and away from each other for pressing the squeezed-off candy pieces therebetween and transferring the same from said mold member to a collecting point, and control means arranged to control the movement of said pairs of plunger means for successively transferring squeezed-off candy strand pieces into said mold member and ejecting the squeezed-off candy strand pieces from said mold member following the shaping of the squeezed-off candy strand pieces in said mold member.

References Cited in the file of this patent

UNITED STATES PATENTS

| | | |
|---|---|---|
| 2,157,467 | Thurlings | May 9, 1939 |
| 2,695,569 | Spohr | Nov. 30, 1954 |
| 2,756,697 | Brook | July 31, 1956 |

FOREIGN PATENTS

| | | |
|---|---|---|
| 170,992 | Austria | Apr. 10, 1952 |